F. C. LUCKE D'AIX.
TYPOGRAPHIC MACHINE.
APPLICATION FILED MAR. 28, 1913.
1,083,195.
Patented Dec. 30, 1913.
7 SHEETS—SHEET 3.
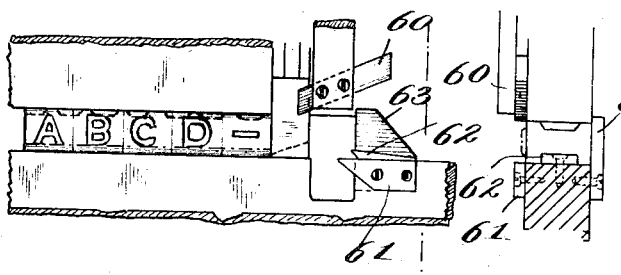
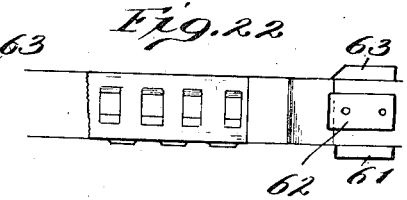
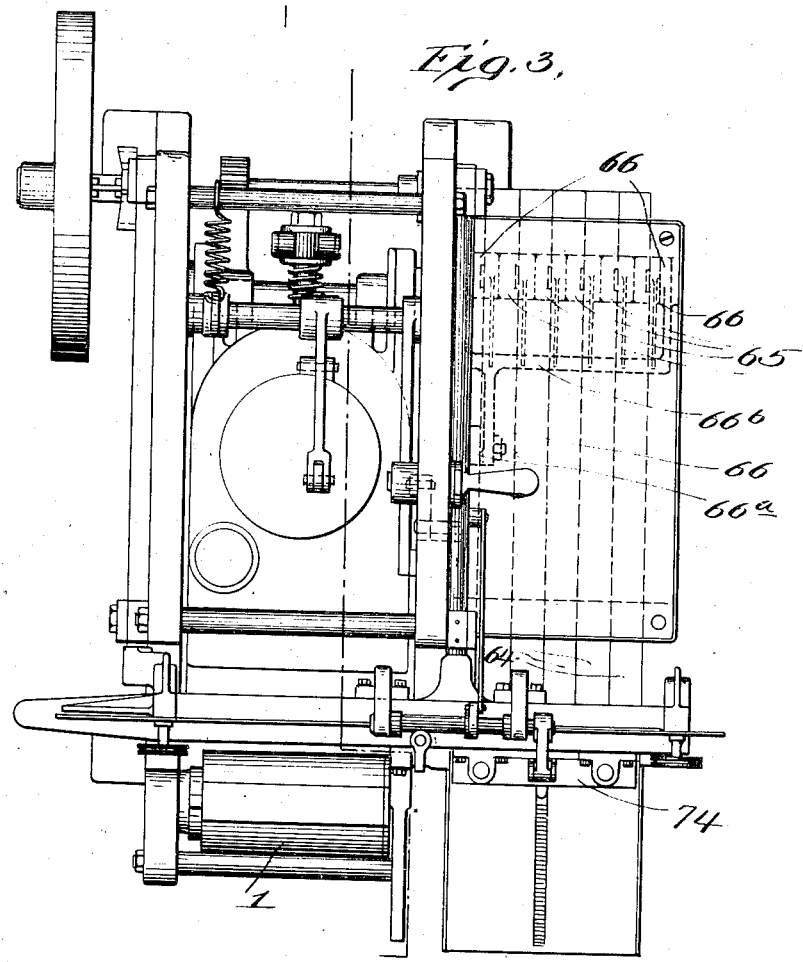
Witnesses:
H. B. Marston
Inventor
Fritz C. Lucke d'Aix
By Attorney
Marcellus Bailey

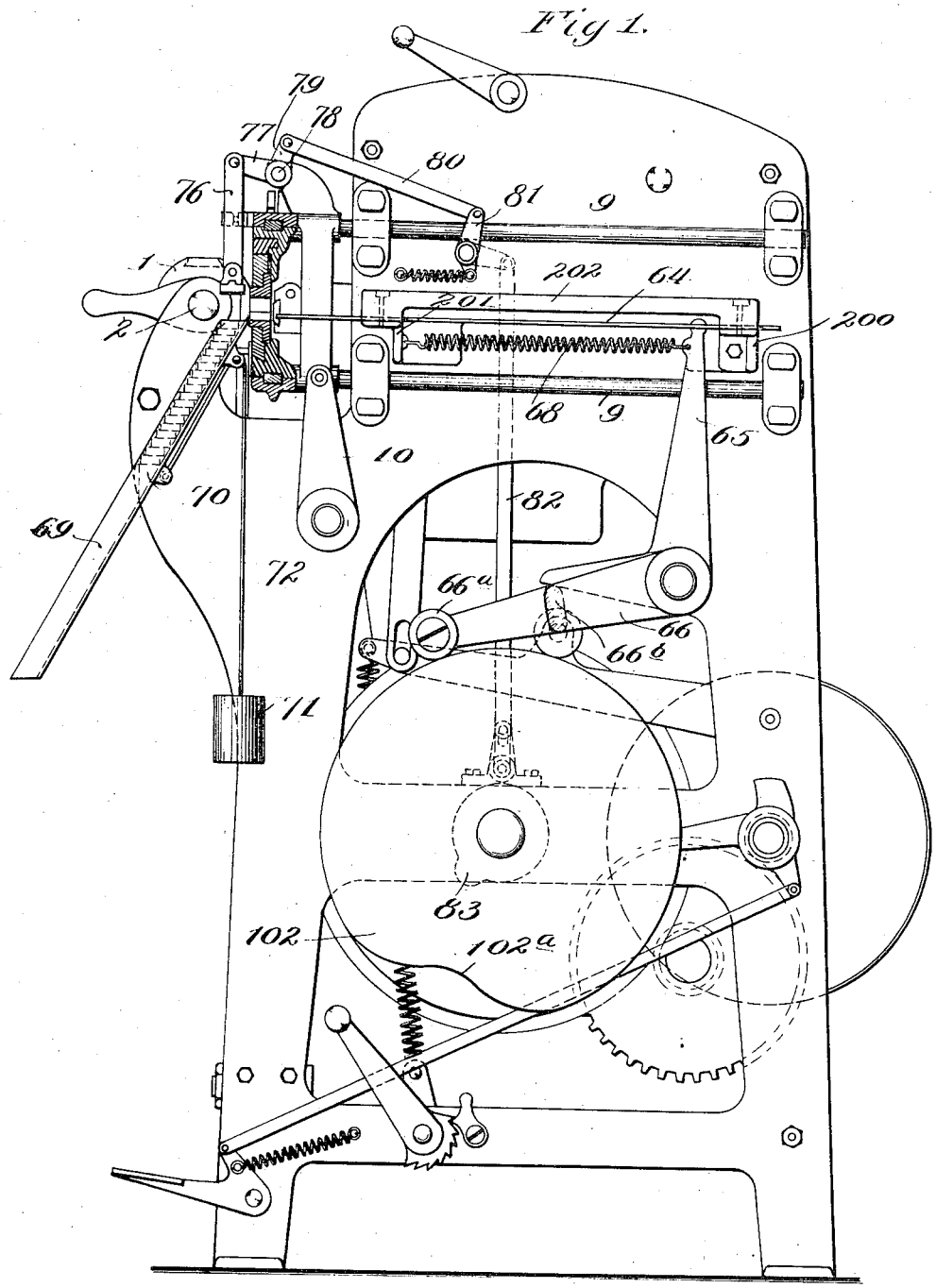

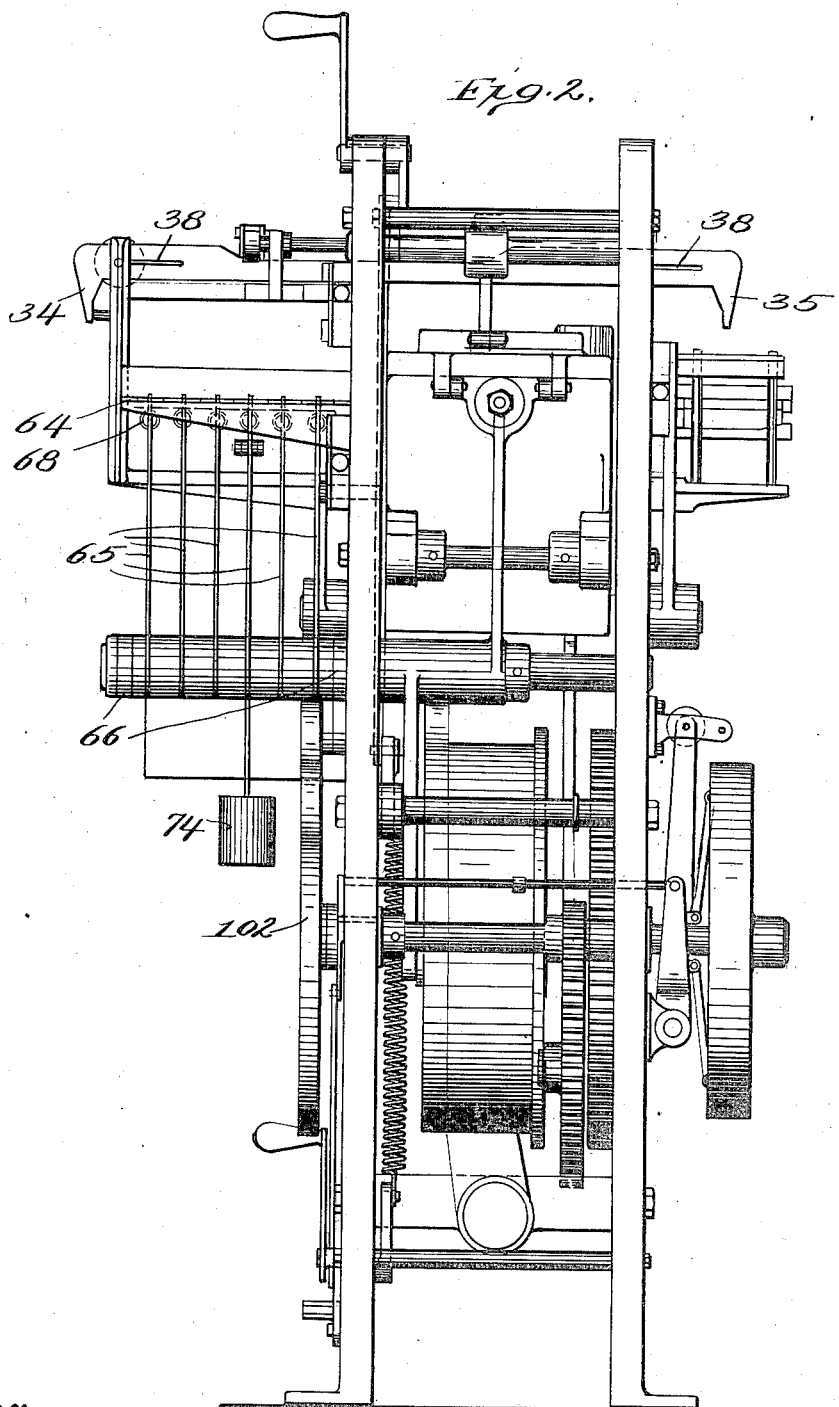

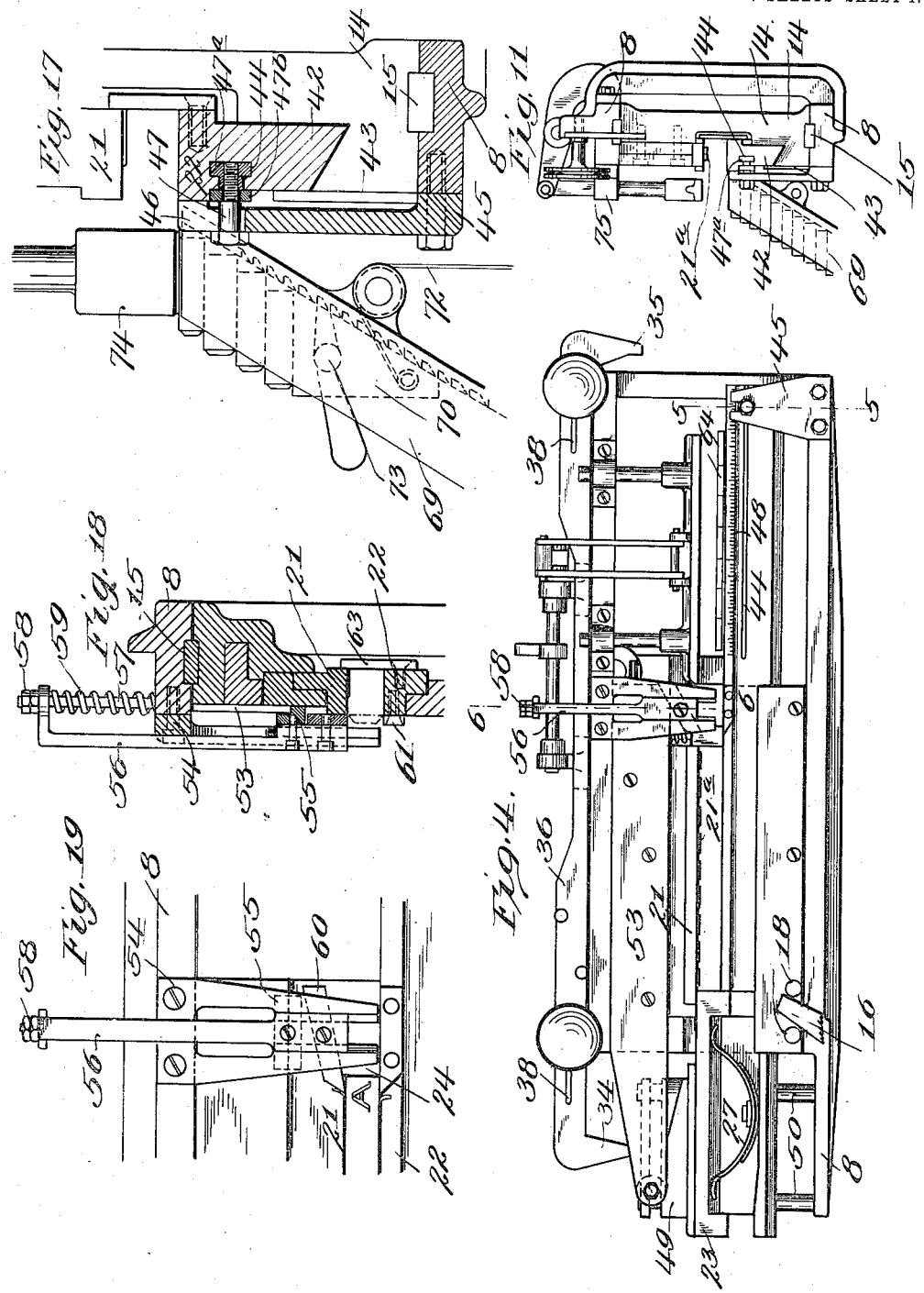
F. C. LUCKE D'AIX.
TYPOGRAPHIC MACHINE.
APPLICATION FILED MAR. 28, 1913.
1,083,195.
Patented Dec. 30, 1913.
7 SHEETS—SHEET 4.

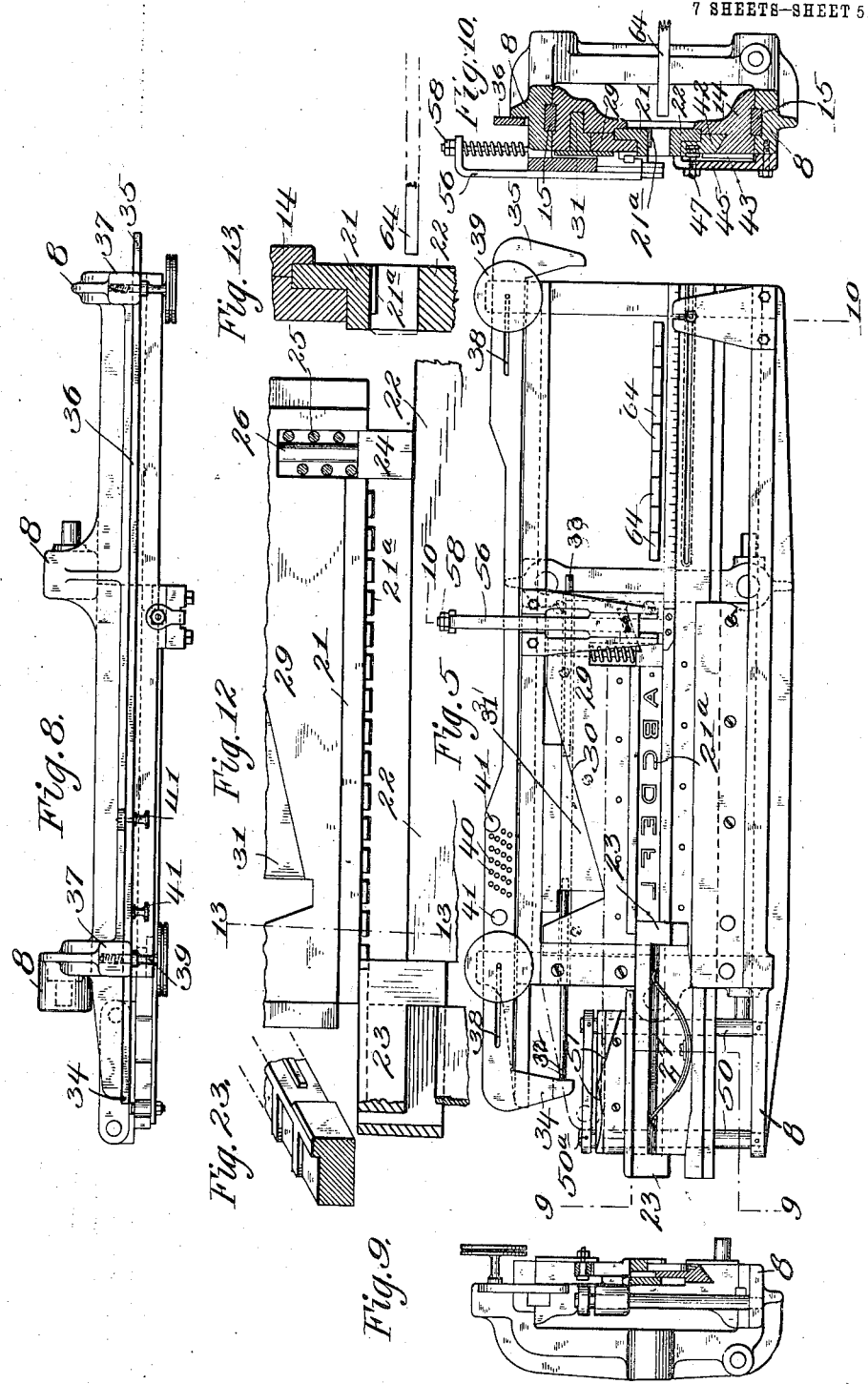

F. C. LUCKE D'AIX.
TYPOGRAPHIC MACHINE.
APPLICATION FILED MAR. 28, 1913.
1,083,195.
Patented Dec. 30, 1913.
7 SHEETS—SHEET 6.
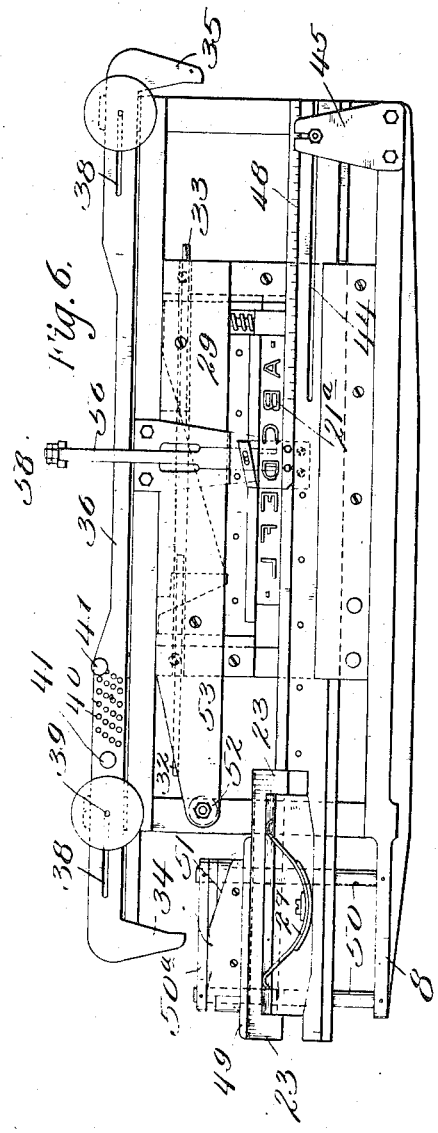
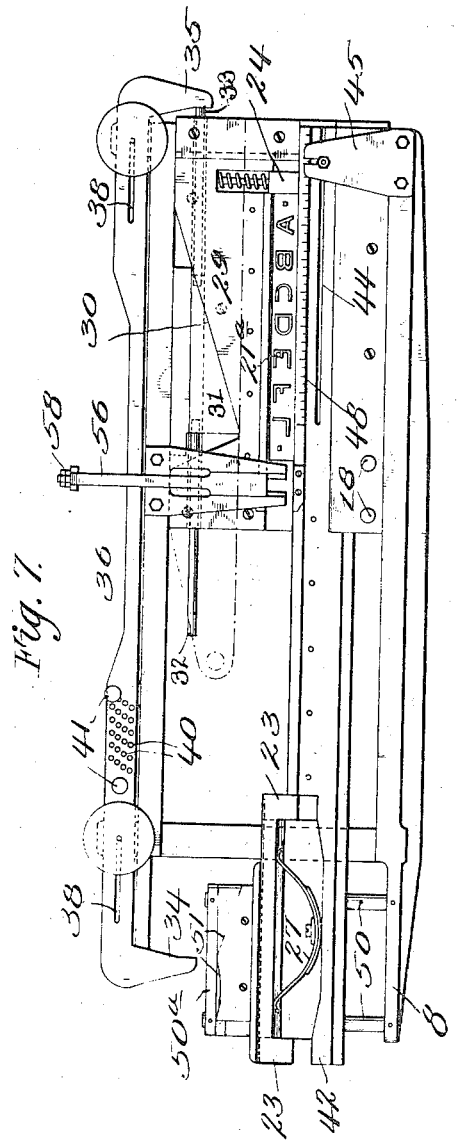
Witnesses:
H. B. Marston
Inventor
Fritz C. Lucke d'Aix
By Attorney F. C. LUCKE D'AIX.
TYPOGRAPHIC MACHINE.
APPLICATION FILED MAR. 28, 1913.
1,083,195.
Patented Dec. 30, 1913.
7 SHEETS—SHEET 7.
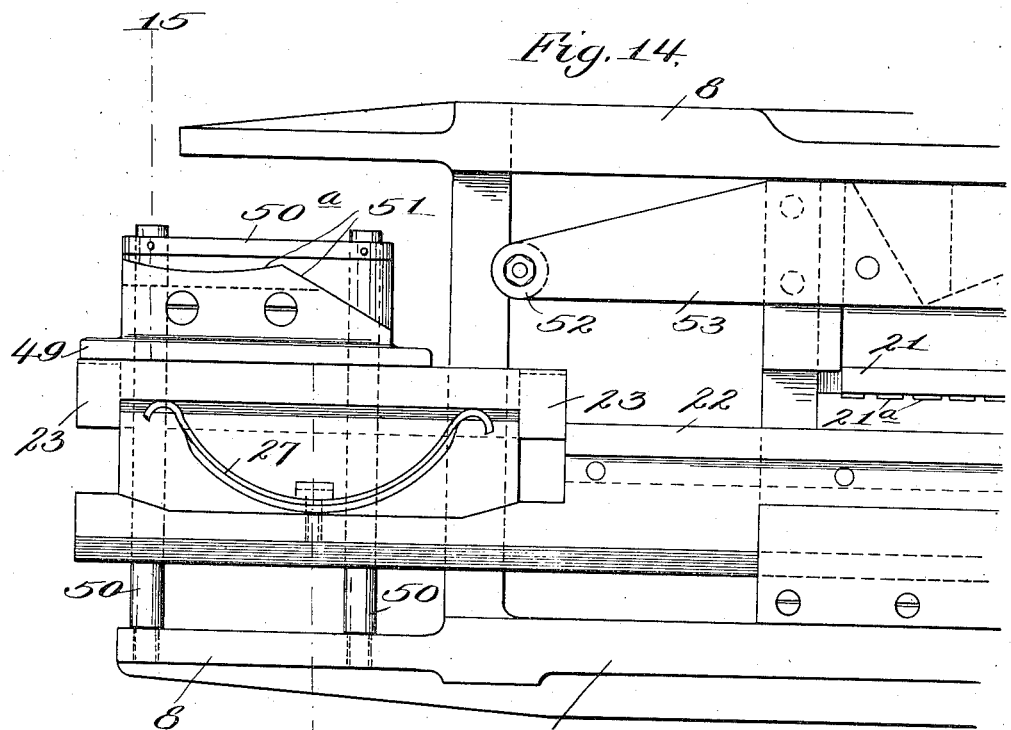
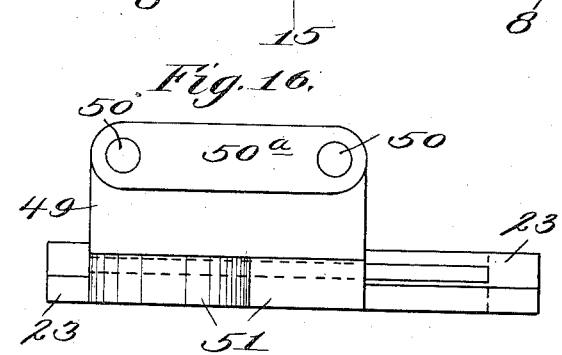
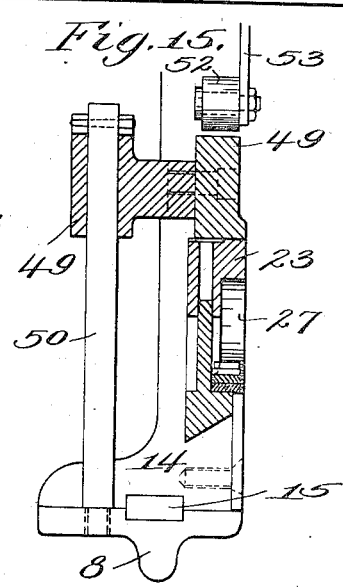
Witnesses:
H. B. Marston
G. Kesler
Inventor
Fritz C. Lucke d'Aix
By Attorneys
Manilera Paily

UNITED STATES PATENT OFFICE.

FRITZ C. LUCKE D'AIX, OF BROOKLYN, NEW YORK.

TYPOGRAPHIC MACHINE.

1,083,195.  Specification of Letters Patent.  Patented Dec. 30, 1913.

Original application filed November 14, 1908, Serial No. 462,670. Divided and this application filed March 28, 1913. Serial No. 757,347.

*To all whom it may concern:*

Be it known that I, FRITZ C. LUCKE D'AIX, of Brooklyn, in the county of Kings and State of New York, have invented certain new and useful Improvements in Typographic Machines, of which the following is a specification.

This application is a division of my application for U. S. Letters Patent, filed November 14, 1908, Serial No. 462,670, and is directed to the mold and ejector devices of said last named application.

The improvements which are the subject matter of this application, will first be described in connection with the accompanying drawings forming part of this specification and will then be more particularly pointed out in the claims.

In said drawings—Figure 1 is a side elevation of a machine embodying my improvements, showing the mold and mold carrier in section. Fig. 2 is a rear elevation of the machine. Fig. 3 is a top plan view of the machine. Fig. 4 is a front view of the mold in casting position, but no slug having been cast. Fig. 5 is a front view of the mold in the same position as in Fig. 4, with the slug cast, and portions of the parts in front removed to better disclose structural details in rear. Fig. 6 is a front view of the mold showing it about half way in its travel from casting to ejecting position. Fig. 7 is a like view of the mold in ejecting position, with the slug released and ready for ejection. Fig. 8 is a top plan of Fig. 5. Fig. 9 is a left hand end elevation of the mold, with some of the parts in section on line 9—9 Fig. 5. Fig. 10 is a right hand end elevation of the mold, with some of the parts in section, on line 10—10 Fig. 5. Fig. 11 is a right hand end elevation of the mold. Fig. 12 is a front elevation on enlarged scale of the mold jaws to show more plainly the recesses in the face of the upper jaw. Fig. 13 is a cross section of the mold jaws on line 13—13, Fig. 12. Fig. 14 is an enlarged elevation of a portion of the mold showing more clearly how the spring pressed rear end piece 23 of the mold is acted on by the upper mold jaw as it returns from ejecting to casting position. Fig. 15 is a cross section on line 15—15 Fig. 14. Fig. 16 is a top view of the block 49 and end piece 23 Fig. 14. Fig. 17 is an enlarged end elevation, partly in section, on line 5—5, Fig. 4, to show more clearly the receiving galley for the ejected slugs and the devices for effecting the lengthwise adjustment of the mold jaw. Fig. 18 is an enlarged section on line 6—6, Fig. 4, showing more clearly the trimming knives for the slug. Fig. 19 is an enlarged front elevation of the parts shown in Fig. 18. Fig. 20 is a front elevation of one end of the mold showing special trimming knives in their connection with the slug. Fig. 21 is an end sectional elevation of the parts shown in Fig. 20. Fig. 22 is a top plan corresponding generally to Fig. 20, with the upper mold jaw removed, showing the slug and the trimming knives. Fig. 23 is a perspective view of a portion of a cast slug.

A detailed description of the typographic machine illustrated in the drawings is contained in my aforesaid prior application, Serial No. 462,670. I shall, therefore, confine the present specification to a description of the mold and ejector devices, and parts immediately associated with the same.

The matrix carrier 1 is adapted to carry a plurality of lines of matrices, and is rotatable to present any selected one of these lines at the casting position, its shaft 2 being mounted in bearings in the machine frame, all as described in my aforesaid application, Serial No. 462,670. The mold is movable to and from the matrix carrier, so that the front of the mold slot may at the proper time be closed by the presented line of matrices in the matrix carrier. To this end the mold carrier 8 is slidably mounted upon guides 9 carried in the machine frame, and may be moved back and forth on said guides by any suitable means typified by the pivoted lever 10 (Fig. 1), connected at its upper end to the carrier 8, and having its lower end (not shown) operated by any suitable cam device. To actuate those parts of the mold which reciprocate between casting and ejecting positions, said parts are mounted in a slide 14, carried by and longitudinally reciprocable in the carrier 8, being properly guided in its movements therein by guide keys 15. For the purpose of giving the desired reciprocatory movement thereto between casting and ejecting positions, means are provided of any suitable or convenient form, typified by the lever 16, the upper end of which only is shown in Fig. 4, as working between pins 18 on slide 14, The lever will be pivoted to the machine frame, and operated by a cam suitably shaped to give the necessary dwell to the slide in casting and ejecting positions, as will be understood without further explanation by those skilled in the art to which this invention pertains.

I proceed now to a description of the mold itself. It is a traveling mold, variable as to the casting length and width of its slot, and having the end walls of the slot formed by end pieces housed in and interposed between the mold jaws and spring-impelled each toward the face of the opposed jaw to form tight fitting, self-adjusting walls for the ends of the slot, there being provided adjustable means for automatically closing the mold to one length and width of slot, or another as required, and means for automatically opening the mold during its travel from casting to ejecting position. A mold possessing these characteristics is the subject of my prior Patent No. 944,981 of December 28, 1909. The characteristic of my present improvement is that, of the four parts—the two jaws and the two spring impelled end pieces—which form the walls of the mold slot or cavity, the upper jaw and the front end piece are the only parts of the mold which travel from casting to ejecting position and return, the said front end piece being for this purpose housed in the upper jaw, so as to travel with the latter; and the lower jaw together with the spring impelled rear wall of the slot, housed in the same, remain always at casting position, the upper jaw quitting them when moving from casting to ejecting position, and rejoining them on its return from ejecting to casting position, the mold automatically again closing by the time the return movement of the upper jaw is completed. Were the rear end piece housed in the upper jaw and the front end piece housed in the lower jaw, then, although the rear end piece might serve to carry the cast slug along as the upper jaw moves from casting to ejecting position, yet the front end piece, housed in the lower jaw, must first be removed from the path of the cast slug before the upper jaw can start to thus move, and consequently special mechanism must be provided for withdrawing the front end piece before the upper jaw starts from casting to ejecting position, and for holding it thus withdrawn until after the return of the upper jaw to casting position. Under my invention no such special mechanism is required, while the holding of the cast slug to the upper jaw during its travel from casting to ejecting position can be readily effected by providing said jaw with suitable engaging means, as for example recesses in its under or casting face, which will be filled with the type metal injected into the mold slot to form the slug.

Referring more particularly for the present to Figs. 5, 7, and 12 of the drawings, 21 is the upper jaw, 22 the lower jaw, 24 the front end piece associated with the upper jaw, and 23 the rear end piece housed in the lower jaw, these four parts constituting the walls of the mold cavity or slot. The jaw 21 and end piece 24 are mounted in, and move with, the slide 14. The jaw 21 is movable vertically in the slide 14, and the end piece 24 is carried thereby and is slidable in a vertical recess therein. A spring 25 acts on the piece 24 to keep it in close contact with the jaw 22, said spring being shown herein as a coiled spring arranged around a pin 26 fixed to the piece 24, as shown more clearly in Fig. 12. The end piece 23 is connected to the jaw 22, but is free to move up and down transversely thereto and transversely to the width of the slot, and a spring is provided for keeping the end piece 23 in contact with the jaw 21. The said spring is shown herein as a bow spring 27. The lower jaw 22, together with its end piece 23, are connected to the mold carrier 8, and do not participate in the reciprocating movement of the slide 14. The jaw 22, as hereinafter more particularly described, is susceptible of lengthwise adjustment relatively to the upper jaw in order to correspondingly vary the position of the end piece which it carries, and thus to determine the length of the mold slot. The jaw 21 is fixed to a retaining piece 29 having its opposite face inclined, as shown at 30. Mounted in the slide 14, to slide lengthwise thereof, is a controlling piece 31. The said piece has a surface of corresponding inclination to the surface 30 resting in contact therewith. It will thus be seen that movement of the controlling piece 31 will determine the position of the jaw 21 relative to the jaw 22 to govern the width of the mold slot. Suitable devices are provided for governing the movement of the controlling piece 31 and in the illustrated form thereof a pin 32 is shown extending in one direction and a corresponding pin 33 in the opposite direction. A suitable stop 34 is provided for engaging the pin 32 as the mold moves toward the casting position, and, the controlling piece 31 being thereby brought to rest, the continued travel of the mold serves to move the jaw 21 toward the jaw 22 against the pressure of the springs 25 and 27 to give a slot of the desired width at the casting position. The stop 34 is adjustable so as to govern the relative movement between the controlling piece 31 and the piece 29 for the purpose of varying the width of the slot. A suitable stop 35 is provided for engaging the rod 33 as the mold moves to the ejecting position thereby moving the controlling piece 31 in the opposite direction and thus allowing the jaw 21 to recede from the jaw 22 under the action of the spring 25. It will be understood, therefore, that while the relative position of the controlling piece 31 and the retaining piece 29 determine the width of the slot, the periodic movement of the controlling piece 31, as described, serves to bring the mold to width for casting and to open it for the ejection of the slug. As shown herein, referring more particularly to Figs. 5, 6, 7, 8, the stops 34 and 35 are parts of a bar 36 mounted upon standards 37 fixed with respect to the carrier 8. The said bar is shown provided with slots 38, through which pass clamping screws 39. If desired, means for further securing the bar 36 in position may be employed and a form of such means is shown herein comprising a series of apertures 40 in the bar 36, there being a corresponding series of apertures in the mold carrier 8, a pin 41 passing through two of these apertures in register serving to secure a bar 36 against displacement by impact of the rods 32 and 33 against their respective stops. The jaw 22, as hereinbefore said, is attached to the mold carrier 8. It is attached to the carrier through the intermediary of a support 42, which rests in an undercut recess in the top of the lower longitudinal limb of the slide 14, as shown in Fig. 10 (Sheet 5) and Fig. 17 (Sheet 4), a retaining plate 43 on the front of the slide 14 overlapping the front of the support 42, and assuring these parts in operative position relatively to one another. Support 42 is secured to the carrier 8 by a bracket 45 on the front of the carrier, to which bracket the support is secured. Bolt or clamping screw 47, at its threaded end, passes into the slot 44 in support 42—said slot being of T form in cross section, as indicated in Fig. 17—through a plate or washer 47$^b$ which rests against the face of the support 42. The threaded end of the bolt is reduced in diameter and engages a T-shaped piece 47$^a$ contained and fitting in the slot 44, and slidable therein. To fasten the jaw 22 and its support 42 in the position to which said jaw may be adjusted for any given length of slot, the clamping bolt 47 is tightened, thus pressing with its shoulder (formed at the junction of its threaded end of reduced diameter with the body of the bolt) against the plate or washer 47$^b$ to hold it tight against the face of support 42, while at the same time it draws the slidable piece 47$^a$ firmly against the opposed side of the slot 44 in support 42, thus clamping tightly support 42, and consequently jaw 22, in adjusted position. If desired, a scale 48 may be used for facilitating the adjustment of the slot length. In the reciprocation of the slide 14 between casting and ejecting positions, the upper jaw 21 and front end piece 24, move with said slide, while the lower jaw 22 and rear end piece remain at rest. The cast slug, which is carried by the upper jaw from casting to ejecting position, must therefore move over the face of the lower jaw, and for this reason the lower jaw, as shown, is of length to extend from ejecting to casting position. In order to thus move the cast slug, suitable means for engaging the slug with the upper jaw are provided, consisting in the present instance of projections 21$^a$ on the under or casting face of the upper jaw, Figs. 4, 10, 11, 12, the intervals between which form recesses which at the time of casting the slug are filled with type metal, to form lugs by which the slug is carried along with the upper jaw when the latter moves from casting to ejecting position, the slug during this movement sliding along over the lower jaw 22. The general form of the slug is shown in Fig. 23. By the time the slug reaches ejecting position the jaw 21 has been lifted away from it far enough to be disengaged from the lugs on the top of the slug, leaving it free to be expelled by the ejector. The upper face of the upwardly spring pressed end piece 23 bears against the under face of a block 49, slidably mounted upon vertical rods 50 fixed to carrier 8, and tends to lift said block upwardly thereon. A stop bar 50$^a$ fixed to the top of the rods 50 limits the extent of upward movement of the block, as indicated more clearly in the enlarged views, Figs. 14, 15, 16. On the block is a track 51 to coöperate with a roll 52, carried upon arm 53 attached to the jaw 21, and projecting beyond the left hand end of that jaw far enough to meet and travel over the trackway 51 so as to depress it to the proper extent before the upper jaw completes its return movement from ejecting to casting position. The front portion of the trackway 51, which first meets the roll 52, is inclined as shown in Figs. 4, 5, 6, 7, and, on enlarged scale in Figs. 14, 16, to afford the roll 52 proper access to the trackway. The continued rearward travel of the roll over the inclined portion of the trackway will depress the block 49, and consequently the end piece 23, until the latter is brought into a position where it will aline exactly with the under face of the upper jaw to close that end of the mold.

Suitable devices for trimming the slug are provided, the form thereof herein shown—referring more particularly to Figs. 18, 19, 20, 21, 22—comprising a slotted guide plate 54 mounted upon the carrier 8, in which is mounted a block 55 resting against and guided by plate 53 in proper relation to jaw 21. Block 55 is fixed to an arm 56 passing around a threaded rod provided with adjusting nuts 58 to which the arm 56 is yieldingly held by a spring 59. Mounted upon the arm 56 is a trimming knife 60 to shave or trim the front face of the cast bar along its upper edge for the purpose of removing therefrom any rib or fin remaining from casting. A knife 61 is also shown mounted upon the jaw 22 in position to act against the front face of the cast slug at its lower edge. A suitable knife 62 is also mounted upon the lower jaw 22 for the purpose of trimming the side face of the slug to bring it to the proper thickness. A knife 63, also secured to jaw 22, is provided for trimming off the sprue from the bottom side of the slug to bring it to the proper height and to have the bottom face parallel to the character face.
The ejecting mechanism is illustrated in Figs. 1, 2, 3, 11, and 17. The ejector itself is a sectional ejector composed of a plurality of strips or sections 64, with parallel lower edges, put together edge to edge to form a flat plate which is arranged to reciprocate to and from the mold, in the plane of the mold slot when the mold is in ejecting position. To this end the sections 64 are supported in bearings in the ends 200, 201, of a bracket 202 attached to the side of the machine in rear of the mold, and in position where they will be opposite to, and in the plane of, the slot containing the cast slug when the mold is in ejecting position. The operating levers for the ejector sections 64, are shown at 65—one for each ejector section. They are in the form of bell crank levers, suitably pivoted side by side in the machine frame on a common axis, engaging at one end their respective ejector sections, and at their others resting on the cross bar 66$^b$ of lever 66 which is pivoted on the same axis with the bell crank levers 65, and has on its free end a roll 66$^a$ which is in operative relation with a peripheral cam 102 provided at one point on its periphery with a depression 102$^a$. The ends of the levers 65 which rest on the cross bar 66$^b$ are held down thereon with yielding pressure by springs 68—one for each lever 65—secured at one end to the front end 201 of bracket 202, and at the other end to their respective levers, being thus enabled to follow the movement of the cam actuated lever 66. The downward movement of lever 66 permits the levers 65 to be pulled by their springs in a direction to cause them to advance their respective ejector sections. In this forward movement the sections 64 are independent of one another, each being influenced by its own spring, and should one or more of the sections be held back against the stress of their springs the other sections would still move forward independently of and without reference to them. On the other hand, the retraction of the ejector sections, due to the upward movement of the lever 66, is a positive movement affecting all of them, the cross bar 66$^b$ of the rising lever positively tilting the levers 65 in a direction to retract all of the ejector sections against the stress of their springs 68. By a construction of ejector parts such as described, it will be understood that, when permitted by the cam 102, the springs 68 will act upon levers 65 to move forward the ejector sections 64. Such of these sections as are in alinement with the slot will engage the slug and eject it from the slot. Should any of the sections 64 not be in alinement with the slot, as might be the case, especially in the form of mold wherein both jaws move out to ejecting position, as in my aforesaid Patent No. 944,981, they would come in contact with the back of the mold and be arrested thereby. The cam depression 102$^a$ permits the downward movement of the lever 66 and the consequent forward movement of the ejector sections. Continued rotation of the cam lifts the lever 66 out of the cam depression, and this upward movement of the lever, as before explained, effects the positive retraction of all of the ejector sections. The ejected slug passes to the receiving galley 69, into which it is pressed down by plunger 74 to make room for the following slug. The receiving galley has a movable bottom 70 to which is connected by cord 72 a weight 71 which tends to pull the bottom in an upward direction. A suitable pawl and ratchet mechanism is provided for holding the bottom 70 in position against the pull of the weight. The plunger 74 is slidably mounted upon rods 75 on the carrier 8, and is connected by pivoted links 76 and crank arms 77 to a shaft 78. Fixed to said shaft is a crank arm 79 connected by a link 80 to a bell crank lever 81, which latter is connected to one end of a rod 82, the other end of which is in operative relation to a cam 83. Through the action of the train of mechanism, the plunger 74, upon ejection of each slug into the receiving galley 69 is operated to press the slug down therein below the level of the lower jaw 22, so as to make room for the following slug, the bottom 70 feeding downward as the slugs are pressed into the galley, and being held in each position by the pawl 73.
I state in conclusion that I do not restrict myself to the structural details hereinbefore set forth in illustration of my invention, since manifestly the same can be considerably varied without departure from the
spirit of my invention; but
What I claim herein as new and desire to secure by Letters Patent, is as follows:
1. In a mold of the character specified, the combination of a lower jaw; an upper jaw mounted to slide longitudinally between casting and ejecting positions; an end piece housed in the upper jaw, spring pressed against the lower jaw, and constituting the front end wall of the mold cavity; an end piece housed in the lower jaw, spring pressed toward the upper jaw, and constituting the rear end wall of the mold cavity; and means for engaging the cast slug with the upper jaw during the travel of the latter from casting to ejecting position, substantially as hereinbefore set forth.

2. In a mold of the character described, the combination of a lower jaw; an upper jaw with recessed casting face, movable to and from the lower jaw, and mounted to slide longitudinally between casting and ejecting positions; an end piece housed in the upper jaw, spring pressed against the lower jaw and constituting the front end wall of the mold cavity; an end piece housed in the lower jaw, spring pressed toward the upper jaw and constituting the rear end wall of the mold cavity; means for automatically lifting the upper jaw at ejecting position away from the lower jaw to disengage its recessed face from the cast slug; and means for automatically returning said jaw to normal closed position after the ejecting and before the next succeeding casting operation, substantially as hereinbefore set forth.

3. The combination of the mold carrier; the lower jaw, mounted in said carrier and adjustable lengthwise therein to vary the length of the mold slot; the slide mounted in said carrier and movable therein between casting and ejecting positions, and mechanism for thus reciprocating the slide; the upper jaw with recessed casting face mounted in said slide and vertically adjustable therein to vary the width of the mold cavity; the rear spring pressed end piece 23 housed in the lower jaw and constituting the rear end wall of the mold cavity; the front spring pressed end piece 24 housed in the upper jaw and constituting the front end wall of the mold; means for automatically lifting the upper jaw at ejecting position away from the lower jaw to disengage its recessed face from the cast slug; and means for automatically returning the upper jaw, together with the front end wall piece 24 carried by the same, to normal closed position after the ejecting and before the next succeeding casting operation, substantially as hereinbefore set forth.

4. In a machine of the character described, a mold comprising lower and upper jaws constituting the mold body and cap respectively, the upper jaw being longitudinally reciprocable between casting and ejecting positions, and the lower jaw remaining at casting position; an end piece housed in the lower jaw and constituting the rear wall of the mold cavity; an end piece constituting the front wall of the mold cavity housed in and reciprocating with the upper jaw, while the lower jaw and rear end wall piece housed in the same remain at casting position; and means for causing the cast slug to move with the upper jaw from casting to ejecting position, substantially as set forth.

5. A typographic machine for casting line slugs having a mold provided with a slot, and an ejector comprising a plurality of sections, each longitudinally movable with respect to the others and independently spring impelled in a direction to eject the slug from the mold, and means for retracting said sections from the mold against the stress of their impelling springs, substantially as hereinbefore set forth.

6. In a typographic machine for casting line slugs having a mold provided with a slot, an ejector reciprocable to and from the mold, and comprising a plurality of sections, each longitudinally movable and spring yielding in a direction away from the mold independent of the others, and means for reciprocating said ejector, substantially as set forth.

In testimony whereof I affix my signature in presence of two witnesses.

FRITZ C. LUCKE D'AIX.

Witnesses:
PAUL E. DE FERE,
FLORENCE B. VERNUTZ.